Figure 1:
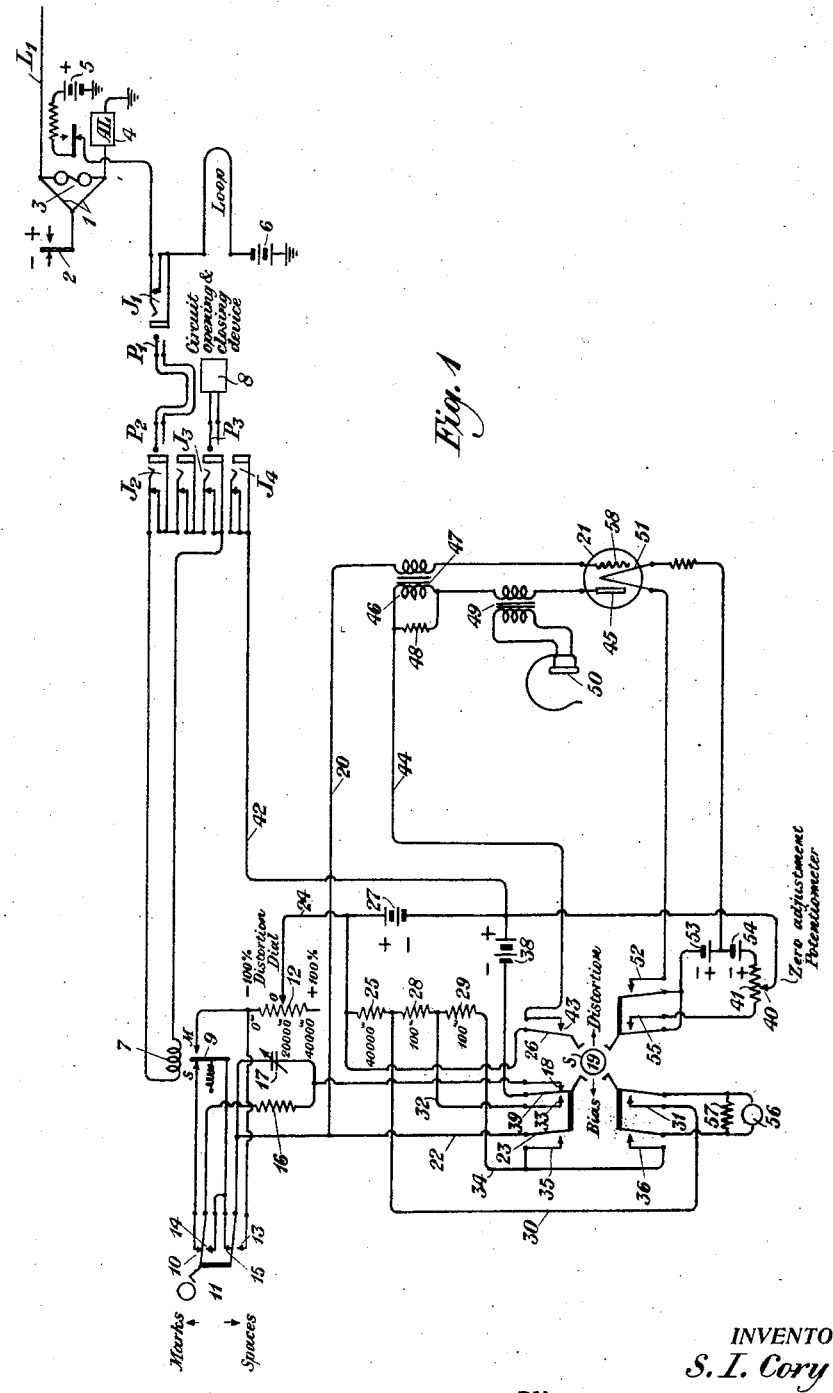

May 10, 1927.

S. I. CORY 1,627,633

TELEGRAPH DISTORTION MEASURING SYSTEM

Original Filed Dec. 22, 1925   2 Sheets-Sheet 1

INVENTOR
S. I. Cory
BY
ATTORNEY

May 10, 1927.  1,627,633
S. I. CORY
TELEGRAPH DISTORTION MEASURING SYSTEM
Original Filed Dec. 22, 1925   2 Sheets-Sheet 2
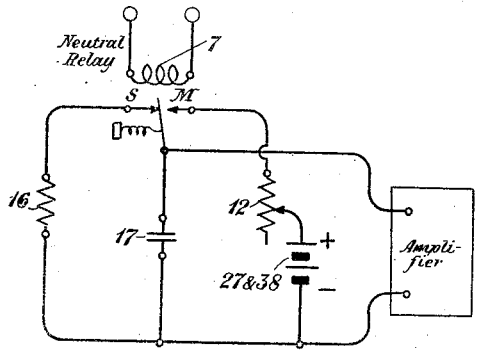
Fig. 2
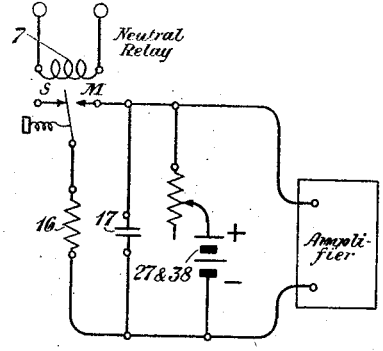
Fig. 3
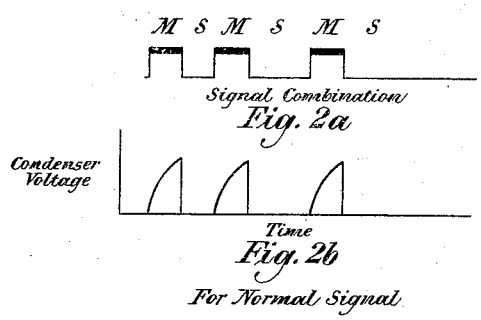
Fig. 2a — Signal Combination
Fig. 2b — For Normal Signal
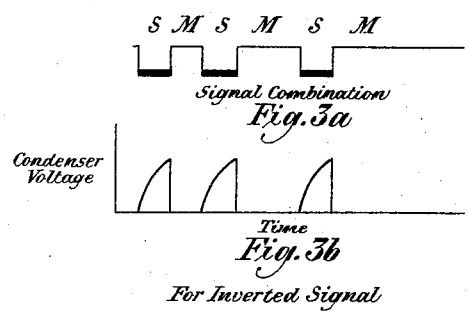
Fig. 3a — Signal Combination
Fig. 3b — For Inverted Signal
INVENTOR
S. I. Cory
BY
ATTORNEY Patented May 10, 1927.

1,627,633

UNITED STATES PATENT OFFICE.

SAMUEL I. CORY, OF ELMHURST, NEW YORK, ASSIGNOR TO AMERICAN TELEPHONE AND TELEGRAPH COMPANY, A CORPORATION OF NEW YORK.

TELEGRAPH DISTORTION-MEASURING SYSTEM.

Application filed December 22, 1925, Serial No. 77,087. Renewed September 30, 1926.

This invention relates to telegraph transmission measuring systems, and particularly to a system of that general class characterized by means for measuring bias and total distortion of the impulses constituting a telegraph signal character.

Heretofore, in the maintenance of telegraph service, the quality of transmission has been approximately determined by means of milammeters in parts of the circuit, and also by the usual listening tests. While such tests have been of considerable value, the need has been felt for some time for means to quantitatively measure the amount of distortion or change in duration which individual marking and spacing elements suffer during the course of transmission.

In the copending application of Cory, Serial No. 65,859, filed October 30, 1925, is disclosed a system by means of which it is possible to measure the distortion of the marking impulses of normal signals, such, for example, as the signal representing the letter C, consisting of three marks or dots of equal length separated by spaces of unequal length; or telegraph reversals, that is to say, a series of alternate marks and spaces of equal length. The arrangement disclosed on said application is not capable of measuring the distortion of the spaces.

It is the object of this invention to provide an arrangement whereby it is possible to measure the lengthening and shortening of the spaces, of a signal combination or of telegraph reversals.

Other objects of this invention will be apparent from the following description when read in connection with the attached drawing, of which Figure 1 shows schematically a form of embodiment of the invention for measuring bias and total distortion of signals; Figs. 2, 2$^a$ and 2$^b$ illustrate the description of the circuit for the measurement of marks and Figs. 3, 3$^a$ and 3$^b$ illustrate the description of the arrangement when measuring spaces.

In Fig. 1, $L_1$ is a signal transmission line over which may be transmitted from the distant end to the receiving circuit shown in the figure a signal, such as, for example, the letter C or the inverse thereof. The letter C, as used in telegraph transmission testing is shown in Fig. 2$^a$. It comprises three marking impulses of unit length separated by spaces of unequal length, the first being of unit length, the second of twice unit length and the third being four units long.

This "C" signal combination has been used very extensively because it has been found that the maximum distortion suffered by this signal combination is at least as great as the distortion suffered by any other combination of telegraph impulses in transmission over a line. It has been found that the measurements made with the normal "C" signal as shown in Fig. 2$^a$ are not sufficient to give a correct indication of maximum distortion in all cases so resort is made to the signal combination shown in Fig. 3$^a$ which is the inverse of the normal signal of Fig. 2$^a$. As will be seen, the inverted signal comprises three unit spaces separated by three marks, the first being of unit length, the second of two unit lengths, and the third being four units long. The measuring system shown in Fig. 1, which is a modification of that shown in the said copending application of S. I. Cory, not only permits measurement of the three equal (unit) spaces of the inverted "C" signal, but also makes possible the measurment of unit spaces of the normal "C" signal or of any signal combination.

The line $L_1$ of Fig. 1 is connected with the ratio arms 1, to the apex of which a transmitting device 2 is connected, and across the extremities of which a receiving relay 3 is connected. An artificial line 4 balances the line $L_1$. While the duplex line has been chosen to illustrate the invention, any form may be used. The armature of relay 3 is connected with the positive terminal of the source 5 which has its negative terminal grounded. The contact of this relay is connected through the contacts of the jack $J_1$ with the subscriber's loop circuit which is connected with the negative terminal of the source 6, which has its positive terminal grounded. The sources 5 and 6 are thus connected in the series-aiding manner. The purpose of the jack $J_1$ is to permit the connection into the loop circuit of apparatus for measuring the signals produced in the loop circuit by the operation of relay 3 in response to signals received by the said relay from the line $L_1$.

The transmission measuring set comprises the jacks $J_2$, $J_3$, etc. and the apparatus shown schematically to the left thereof. This circuit is connected with the loop circuit by means of a patching cord having a plug $P_1$ for insertion in the jack $J_1$, and the plug $P_2$ for insertion in the jack $J_2$. A circuit opening and closing device 8 or a commutator for sending test signals is adapted for connection with the measuring circuit by the insertion of the plug $P_3$ in the jack $J_3$. This circuit opening and closing device is designed to control the operation of the relay 7 in calibrating the set prior to measuring the distortion of the signals received by relay 3, and can be arranged to form and send normal or inverted "C" signals and telegraph reversals. The armature 9 of relay 7 moves between a marking and a spacing contact designated M and S, respectively. The spacing contact is connected with the contact point 10 of the key 11. The marking contact is connected with one of the terminals of the resistance 12, which forms part of a distortion measuring resistance which, for brevity, will be called the distortion dial. This terminal is also connected with the contact point 13 of the key 11. The armature 9 is connected with the inner contacts 14 and 15 of the key 11. The upper movable member of the key 11 is connected with the resistance 16, and the lower movable member with the condenser 17. The lower terminal of the resistance 16 and the lower plate of the condenser 17 are connected together with the contact 18 of the key 19. The lower movable member of the key 11 is also connected by conductor 20 with the grid of the amplifier 21, through a winding of the feed back transformer 47. This said movable member is also connected by conductor 22 with the movable member 23 of the key 19. The contact point of the distortion dial is connected by conductor 24 with one of the terminals of the resistance 25 and also with a movable member 26 of the key 19, and said contact point is furthermore connected with the source of potential 27. The junction point between the resistances 28 and 25 is connected by conductor 30 with the contact 31 of the key 19. The junction point between resistances 28 and 29 is connected by conductor 32 with the contact point 33 of key 19, and the outer terminal of resistance 29 is connected by conductor 34 with the contact points 35 and 36 of key 19. The negative terminal of the source of potential 38 is connected with the movable member 39 of the key 19, and the positive terminal of the said source is connected, first, with the negative terminal of the source 27, second, with the contact 40 of the potentiometer 41, and, further, by conductor 42 with the jack $J_4$. The contact 43 of key 19 is connected by conductor 44 with the plate 45 of the tube 21, the connection including the winding 46 of the feedback transformer 47 which winding is shunted by the resistance 48. This connection includes also one of the windings of the transformer 49, by means of which the receiver 50 is coupled to the plate circuit. The filament 51 of the tube 21 is connected with the contact 52 of the key 19 and also with the junction point between the sources 53 and 54. The source 53 serves not only to supply the filament heating current for the tube 21, but also, in conjunction with the source 54 and the potentiometer 41, to apply the proper grid bias for the adjustment of the tube circuit whenever the contacts 52 and 55 are closed. A meter 56, shunted by a resistance 57, is connected across the lower left-hand movable members of the switch 19.

The manner in which this circuit operates to measure bias and total distortion is as follows:

When the key 11 is in its normal unoperated position, the circuit is electrically substantially that shown in the copending application of Cory, Serial No. 65,859, filed October 30, 1925. The circuit therein shown measures bias and total distortion of marks, such, for example, as the normal "C" signal shown in Fig. 2ª. In measuring bias, the switch 19 is operated to the left, which serves to connect the meter 56 across the conductors 30 and 34 at the contact points 31 and 36, thus bridging it across the equal resistance arms 28 and 29, each of which may be of the order of 100 ohms resistance. The marking contact of relay 7 would be connected with the midpoint of the resistances 28 and 29 by a circuit including the potentiometer 12, conductor 24, sources 27 and 38 in series, contact 33 of the key 19 and the conductor 32. The resistance 25, which may be of the order of 40,000 ohms, is connected between one of the terminals of the resistance 28 and the junction between the distortion dial and the source 27. The armature 9 is connected with the lower terminal of resistance 29 by a circuit including contact 15 of key 11, conductor 22, contact 35 of key 19, and conductor 34. The circuit just traced is electrically the same as that shown in the dotted portion of Fig. 3 of the said copending application. The manner of measuring bias is the same as described in the said copending application, and it is believed that no useful purpose will be served by describing it again herein.

In order to measure total distortion of marks of a normal "C" signal, as shown in Fig. 2ª, the key 11 should be left in its normal position, and the key 19 thrown to the right. The closing of contact 43 connects the source 27 between the filament and the plate of the tube 21. The closing of contact 18 connects the negative pole of the source 38 with the condenser 17, and thereby brings the two sources 27 and 38 in series with the said condenser and the distortion dial 12 when the armature 9 is on its marking contact. The closing of contact 52 energizes the filament 51 by the source 53, and the closing of contact 55 connects the sources 53 and 54 in series with the potentiometer 51. The grid 58 of the tube 21 is connected by conductor 20 through contact 15 with the armature of relay 7, so that the voltage applied to the condenser 17 by the sources 27 and 38 during the interval in which the armature 9 is on its marking contact will be applied to the grid of the said tube. This circuit, for the measurement of the lengthening or shortening of the marking impulses of normal "C" signals or reversals, is substantially that shown in Fig. 4 of the said copending application, and it functions in the same manner to determine the degree or percentage of lengthening or shortening of the marking impulses. The circuit is schematically shown in Fig. 2.

As briefly mentioned hereinbefore, it has been found desirable to measure the total distortion of the spaces, of both the normal or the inverted "C" signal combinations shown in Figs. 2ª and 3ª, respectively. The circuit shown in Fig. 1 is arranged to measure space distortion by moving the key 11 to its lower position, which opens contacts 10 and 15 and closes contacts 14 and 13. Then the key 19 is thrown to its right-hand position for the measurement of distortion. As will be apparent from later description, the circuit of Fig. 1, with the keys operated as directed above, is schematically that shown in Fig. 3. Thus, the armature 9 is connected through contact 14 of key 11 with the upper terminal of resistance 16, the lower terminal of which is connected with one plate of the condenser 17. The upper plate of this condenser is connected through contact 13 with the marking contact of relay 7. The spacing contact of this relay is open at contact 10 of key 11. The sources of potential 27 and 38 are effectively connected through the distortion dial 12 and contact 13 of key 11 with the upper plate of condenser 17, the lower plate of which is connected through contact 18 of key 19 with the negative pole of the battery 38. The grid of the tube 21 is effectively connected by conductor 20 with the upper plate of the condenser, and the filament of the said tube is effectively connected with the other plate through the contact 40 of the potentiometer 41 the connection including the battery 38. As will be apparent, the measurement of spaces is no different from the measurement of marks as regards the character of the indication in the receiver 50 or in the operation of the dial for indicating lengthening or shortening of the impulse. It will be apparent from Fig. 3ª that inverting the "C" signal of Fig. 2ª involves only an interchange of the marks and spaces of the normal "C" signal, with the result that in the inverted "C" signal we have three spaces of substantially equal length which correspond to the three unit marks of the normal signal. Measurement during the spacing interval instead of during the marking interval is accomplished by connecting the condenser 17 and the associated amplifier to the marking contact of the relay, and connecting the resistance 16 to the tongue of the relay as shown in Fig. 3. It will be apparent from this figure, that the condenser 17 charges during the interval in which the armature 9 is away from the marking contact, and it discharges when the armature touches its marking contact. The condenser acquires a voltage which, as shown in Fig. 3ᵇ, is dependent upon the duration of the space.

In calibrating the device inverted "C" signals are applied to the relay 7 by the circuit opening and closing device 8 in the same manner as for normal "C" signals, as described in the said copending application. The relay 7 is adjusted to be unbiased in the same manner as is therein described so that the armature 9 rests upon the marking contact for a length of time equal to that during which it is away from the marking contact. That is to say, the length of time that it remains upon its marking contact equals the time that it is upon its spacing contact plus the time of travel of the armature in both directions. In adjusting the zero of the amplifier, the distortion dial 12 is set at zero, and the zero adjustment dial 41 is set so that the amplifier 21 just responds to the condensed voltage attained at the end of the undistorted spacing impulse. With the set thus adjusted, the device 8 is disconnected by removing plug P₃ from jack J₃. Lengthening of the received spacing impulse of an inverted "C" signal traversing the loop circuit and actuating relay 7 permits the condenser 17 to take a higher voltage during that interval, which produces louder clicks in the receiver 50 connected with the plate circuit of the vacuum tube. The distortion dial is varied until the clicks are just heard, and the amount of adjustment of the dial is a measure of the distortion. The shortening of the impulses is measured by decreasing the resistance indicated by the dial until clicks are heard in the receiver for all spacing impulses of the signal.

When the armature moves to its marking contact, the condenser 17 will discharge through the resistance 16, so that the voltage across the condenser will be substantially nil due to the fact that the resistance is of small magnitude.

Since relay travel time and chatter effects are present in the case of measurement of marks, and are absent in the measurement of spaces when using the before described circuit arrangement, the amplifier will require a different zero adjustment for measuring marks than for spaces if no other provision is made to take accounts of the effects of travel time and chatter. The effect of increasing the armature of travel time in the case of measuring marks is to increase the loudness of the response from the amplifier, due to the fact that a longer time is allowed for the oscillations which causes the response. In the case of measuring spaces, changing the travel time has no effect whatever upon the response, since the time allowed for the oscillation is determined solely by the quickness with which the condenser is discharged through the resistance 16. If this resistance is very small, the condenser discharges quickly, and it is necessary to adjust the amplifier so that it will start to oscillate at a somewhat lower condenser voltage than would be required if the discharge were less rapid. Increasing the value of the resistance 16 slows down the rate of discharge to some extent and prolongs the time for oscillation. It has, accordingly, been found desirable in the present arrangement to increase the value of the resistance 16 to about 300 ohms. This change produces only negligible error in the measurement of spaces except when the distortion is in the neighborhood of 90 to 100%.

The effect of chatter on the measurement of marks is to introduce a delay in growth of voltage on the condenser, due to the armature rebounding from the marking contact after the condenser has started to charge. When measuring spaces, the condenser voltage begins to increase as soon as the tongue leaves the marking contact and continues to increase without interruption until the tongue returns to the marking contact. Since the condenser is quickly discharged at the moment that the tongue touches the marking contact, chatter has no effect upon the condenser voltage at the end of the space. This difference in the effects produced when measuring marks and spaces would ordinarily necessitate a change in the zero adjustment of the amplifier when switching from the measurement of marks to spaces. However, since it is possible to operate the relay in the set with comparatively small armature travel and, hence, to limit to some extent the amount of chatter, such change in the zero adjustment may be avoided. The armature travel should be made about .002 inch. However, no considerable difference in the indication of the set will be noticed unless the armature travel appreciably exceeds this amount.

In view of the foregoing detailed description of the arrangement shown in Fig. 1, it will be seen that such device renders it possible to measure the lengthening and shortening of unit marks and of unit spaces normal and inverted "C" signals or any other signal combination.

While this invention has been disclosed as embodied in a particular form, it is capable of embodiment in other and different forms without departing from the spirit and scope of the appended claims.

What is claimed is:

1. In a system for measuring total distortion of telegraph signaling impulses, the combination with a source of signal comprising a mark and a space, of a relay responsive to the said signal, a condenser, a source of potential adapted to charge the condenser during a spacing interval, and means to discharge the condenser during a marking interval.

2. In a system for measuring total distortion of telegraph signaling impulses, the combination with a source of a signal comprising a mark and a space, of a relay responsive to the said signal, means capable of being charged electrically during a spacing interval, and means to measure the magnitude of the charge acquired thereby.

3. In a system for measuring total distortion of telegraph signaling impulses, the combination with a source of a signal comprising a mark and a space, of a relay responsive to the said signal, a condenser, a source of potential normally adapted to be connected with the condenser during a marking interval, and switching means adapted to effect the charging of the condenser during the spacing interval and its discharge during a marking interval.

4. In a system for measuring total distortion of telegraph signaling impulses, the combination with a source of telegraph signals, of a relay responsive thereto, a condenser, a source of potential controlled by the said relay to charge the said condenser during a marking interval and to discharge it during a spacing interval, switching means controlling the connection of the said source with the said condenser to charge the said condenser during the spacing interval and to discharge it during a marking interval, and a vacuum tube amplifier effectively bridged across the said condenser having means to measure the voltage acquired thereby during the said marking and the said spacing intervals.

5. In a system for measuring total distortion of telegraph signaling impulses, the combination with a source of a recurring signal comprising marking and spacing elements whose lengths are to be measured, of a relay responsive to the said signals, a condenser connected with the said relay, a source of potential in series with a known resistance to charge the said condenser during the time in which the armature of the relay remains away from its marking contact, and a vacuum tube having its input side connected across the said condenser having means to measure the voltage acquired thereby.

In testimony whereof, I have signed my name to this specification this 21st day of December 1925.

SAMUEL I. CORY.